US006988354B1

(12) United States Patent
Pargmann et al.

(10) Patent No.: US 6,988,354 B1
(45) Date of Patent: Jan. 24, 2006

(54) ONE-PIECE ROTARY CONVEYOR TINE STRIPPER

(75) Inventors: Amber Rae Pargmann, Ottumwa, IA (US); Henry Dennis Anstey, Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/889,260

(22) Filed: Jul. 12, 2004

(51) Int. Cl.
*A01D 43/02* (2006.01)
*A01D 80/00* (2006.01)

(52) U.S. Cl. .......................................... 56/341; 56/364

(58) Field of Classification Search .................. 56/341
See application file for complete search history.

(56) References Cited

U.S. PATENT DOCUMENTS 5,934,337 A * 8/1999 Fiala et al. ................. 138/149
6,220,442 B1 * 4/2001 Merrell et al. .............. 206/721
6,314,708 B1 * 11/2001 Engel .......................... 56/341
6,526,736 B1 * 3/2003 Anstey ........................ 56/341

* cited by examiner

*Primary Examiner*—Árpád Fábián Kovács

(57) ABSTRACT

An overshot rotary conveyor includes a plurality of sets of flat tines welded to a cylindrical shaft at respective locations spaced across the shaft, each tine including a curved leading edge. Located on the opposite sides of each flat tine and having forward ends received about the cylindrical shaft is a stripper including upper and lower sections. The upper and lower stripper sections include are joined at their forward ends, which define a cylindrical opening disposed about the cylindrical shaft, by a flexible hinge section so that the stripper is of a one-piece construction. The flexible hinge section permits the upper and lower stripper sections to be hinged apart so as to permit the stripper to be received on, or removed from, the cylindrical shaft. Various surfaces of the lower stripper section and surfaces in the vicinity of the flexible hinge section work to prevent stray crop from wrapping about the cylindrical shaft.

3 Claims, 5 Drawing Sheets

34
32
14
32
34
24
24
26
18
16
16
16
16
12
16
10

54
36
64
62
66
72
70
32
76
82
68
80
78
82
78
40
60
80
60
34
58
58
56
52

ONE-PIECE ROTARY CONVEYOR TINE STRIPPER

FIELD OF THE INVENTION

The present invention relates to a rotary conveyor used on a large round baler for conveying crop from the pick-up to the baling chamber, and more particularly relates to a stripper for the rigid tines of the conveyor.

BACKGROUND OF THE INVENTION

Rotary conveyors of the type with which the present invention is particularly adapted for use include a plurality of plate-like teeth or tines mounted to a rotor shaft in axially spaced, diametrically opposite pairs. Located between adjacent pairs of the teeth is a stationary, curved stripper or lifter, with adjacent strippers sandwiching a given pair of teeth and acting to strip or lift crop material from the curved leading edge or surface of the tines.

The current state of the art stripper is disclosed in U.S. Pat. No. 6,526,736 issued 04 Mar. 2003. This stripper is comprised of two separate halves, hinged together by interlocking teeth. The two halves, when together, encompass a rotor shaft of the baler. The distance the halves can be pulled apart while hinged is limited, which hinders the assembly of the strippers around the rotor shaft. Also, the current design requires the two halves to be matched and pre-assembled at the vendor. The cost of the two-piece design, which includes manufacturing costs for de-molding and clean-up, as well as assembly costs, is high. Further, once the baler is in use, the strippers may see large loads due to crop wrapping around the rotor shaft. This causes deformation of the hinge area, which results in decreased effectiveness of the stripper.

SUMMARY OF THE INVENTION

According to the present invention there is provided an improvement to the stripper design disclosed in the above-identified United States patent.

An object of the invention is to provide a stripper that is configured for overcoming the above-noted deficiencies of the prior art stripper.

This object is achieved by making the stripper as a single piece molded plastic unit having a thin section area which defines a hinge zone permitting bottom and top sections of the stripper to be pivoted apart through an angle of approximately 180°. The flexible hinge includes added material, which is an improvement over a living hinge. Furthermore, the stripper is provided with lipped edges in the region of the flexible hinge zone, the edges providing a scraping surface that helps eliminate the wrapping of crop around the rotor shaft. The flexible hinge zone also allows for ease of assembly by providing wider clearance to assemble the one-piece stripper around the rotor shaft, as well as eliminating the need for matching pairs. By making the bottom and top different from each other, they may be tuned to respective functions. In particular, the bottom is now tuned for cleaning out wrapped crop.

These and other objects will become apparent from a reading of the ensuing description together with the appended drawings.

DESCRIPTION OF THE PREFERRED EMBODIMENT

Figure 1:
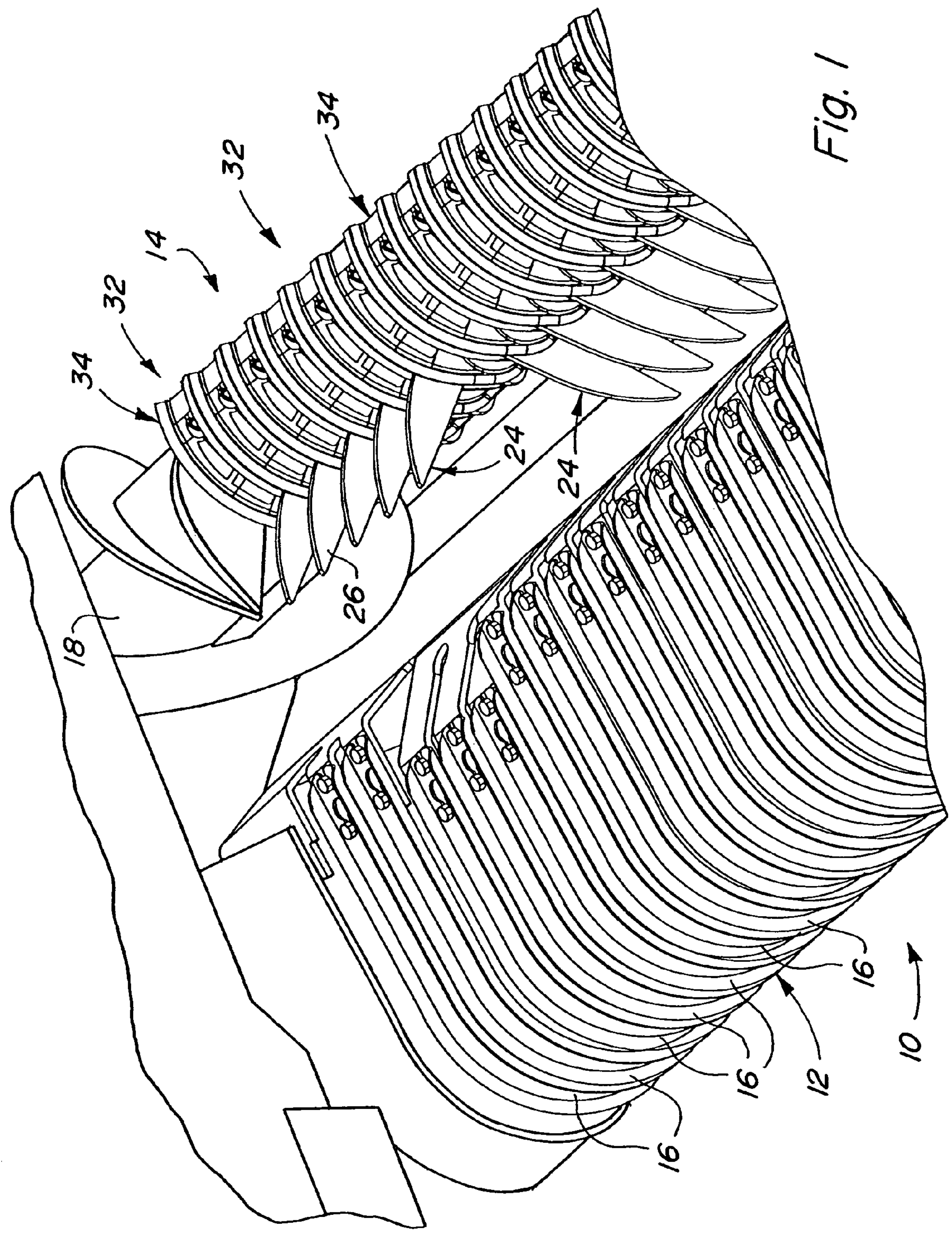
FIG. 1 is a left front perspective view, from above, of a right end portion of a crop material collector showing a wide pick-up together with a rotary conveyor equipped with strippers constructed according to the present invention.

Referring now to FIG. 1, there is shown a crop collector 10, which, for example, is used as part of a baler for making large cylindrical bales. The crop collector 10 includes a pick-up 12 of a conventional structure including a plurality of spring tooth tines (not shown) arranged in side-by-side, angularly spaced groupings which are rotated about a transverse axis so as to lift a windrow of crop material from the ground and deliver it to a rotary conveyor 14, which, in turn, conveys the crop to an inlet of a baling chamber. A plurality of transversely spaced, U-shaped strippers 16 are arranged so as to have the individual tine groupings pass between them, with horizontal sections of the strippers acting to strip crop from the tines.

Figure 2:
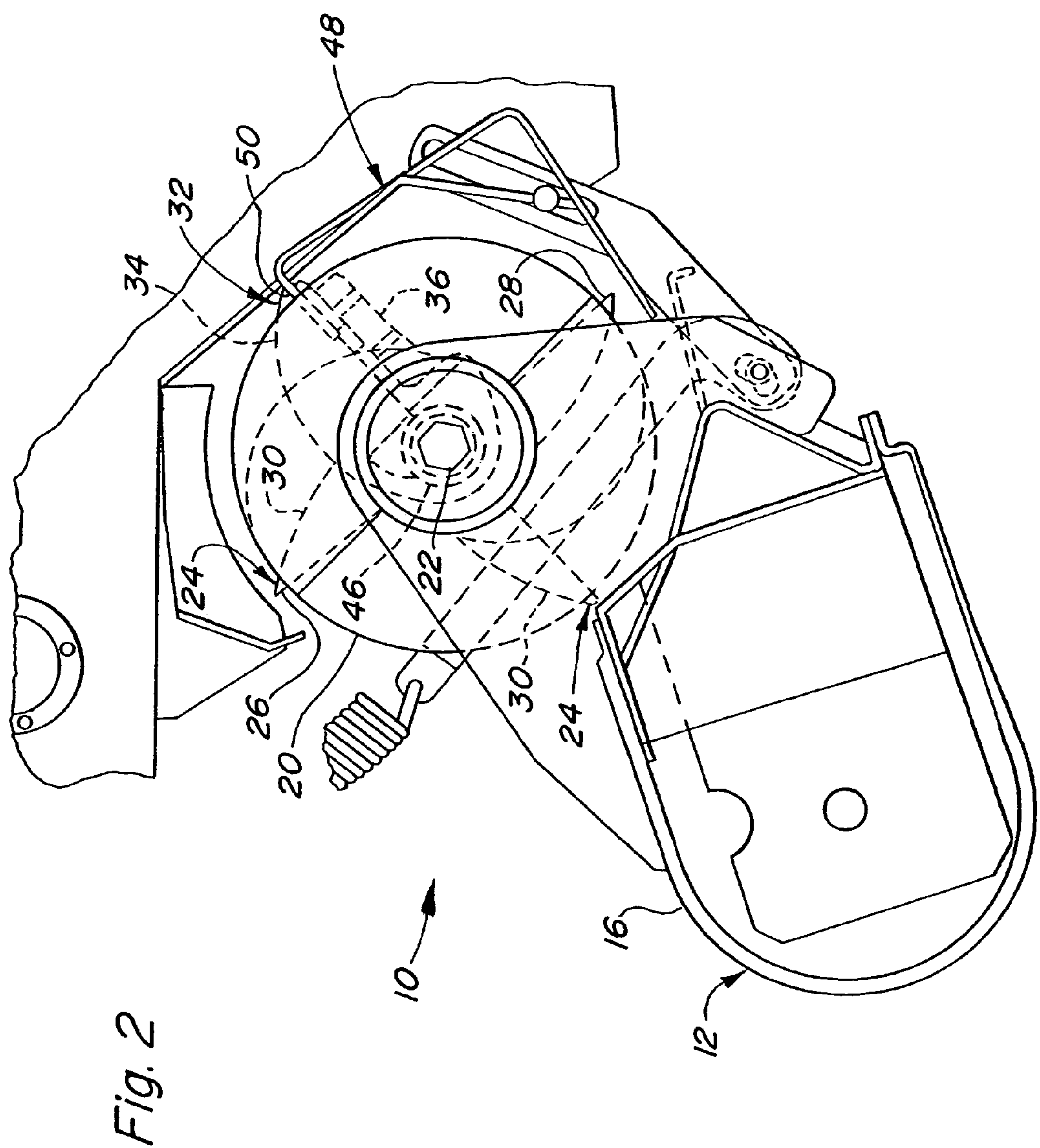
FIG. 2 is a left side elevational view of the crop material collector shown in FIG. 1.

The rotary conveyor 14 is provided with right-and left-hand crop centering augers 18 (FIG. 1) and 20 (FIG. 2), respectively, that are fixed to a hexagonal rotor shaft 22 for overshot rotation and function to narrow the stream of crop, for example, to the width of the baling chamber. Referring now also to FIG. 2, it can be seen that a plurality of transversely spaced, rigid tine structures 24 are mounted on the rotor shaft 22 between the augers 18 and 20. Each of the tine structures 24 is in the form of a flat plate configured to define a pair of diametrically opposite tines 26 and 28 having arcuate leading edges 30. A plurality of tine strippers 32 are mounted in side-by-side spaced relationship along the rotor shaft 22 so as to define respective slots for the passage of the tines 26 and 28 of the respective tine structures 24 during rotation of the shaft 22.

The strippers 32 are each constructed of upper and lower halves 34 and 36, respectively, preferably by molding them from ultra high molecular weight (UHMW) polyethylene, which material has a high wear tolerance. Referring now also to FIGS. 3–6, it can be seen that forward ends of the stripper sections 34 and 36 cooperate to define a cylindrical shell 38 adapted for receiving the rotor shaft 20. The cylindrical shell 38 has a forward wall portion that is sufficiently thin that a flexible hinge section 40 is defined which permits the upper section 34 to be rotated through an angle of 180° relative to the lower section 36 to an open position, as shown in FIG. 5, wherein the cylindrical shell 38 is wide open.

As can best be seen in FIG. 2, the upper and lower stripper sections 34 and 36 are mounted together with the shell 38 defined by their forward ends surrounding a tubular, cylindrical tooth mounting shaft 46 to which the tine structures 24 are welded, the shaft 46 being coupled, as by conventional plates, not shown, for rotation with the drive shaft 22. A stripper support 48 extends transversely behind the rotary conveyor 14 and has an upper end which terminates in a plurality of transversely spaced tabs including downwardly and forwardly inclined mounting portions 50 which are located approximately midway between the two and three o'clock positions about the tooth mounting tube or shaft 46. Each tab mounting portion 50 is located in a slot defined in the rear of a respective one of the strippers 32 by the upper and lower stripper sections 34 and 36, and is provided with a hole in which is received a mounting bolt (not visible) that extends through bores 52 and 54 (see FIGS. 5 and 6) respectively provided in the upper and lower sections 34 and 36, with a nut being received on a threaded end of the bolt for clamping the stripper sections 34 and 36 together and to the tab mounting portion 50.

Figure 3:
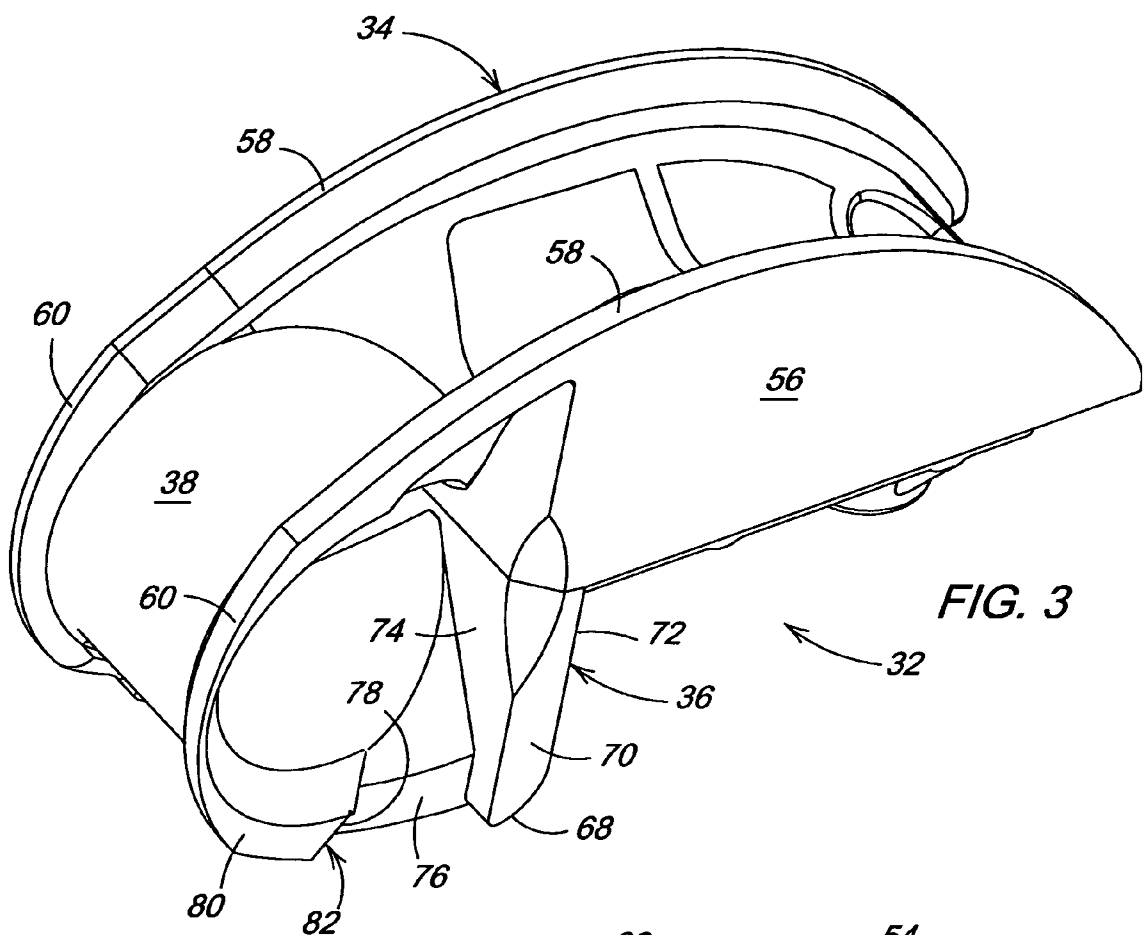
FIG. 3 is a left side perspective view of one of the strippers shown in FIG. 1.
Figure 4:
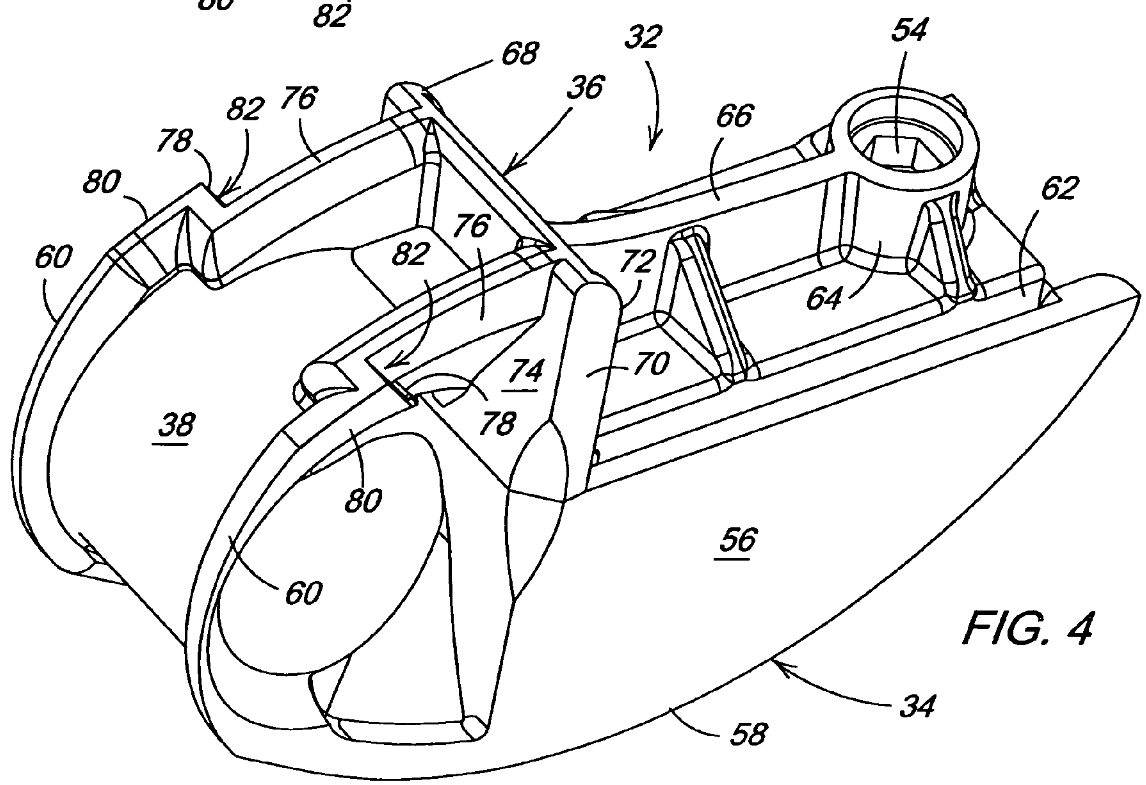
FIG. 4 is a is an inverted perspective view of the stripper shown in FIG. 3.
Figure 5:
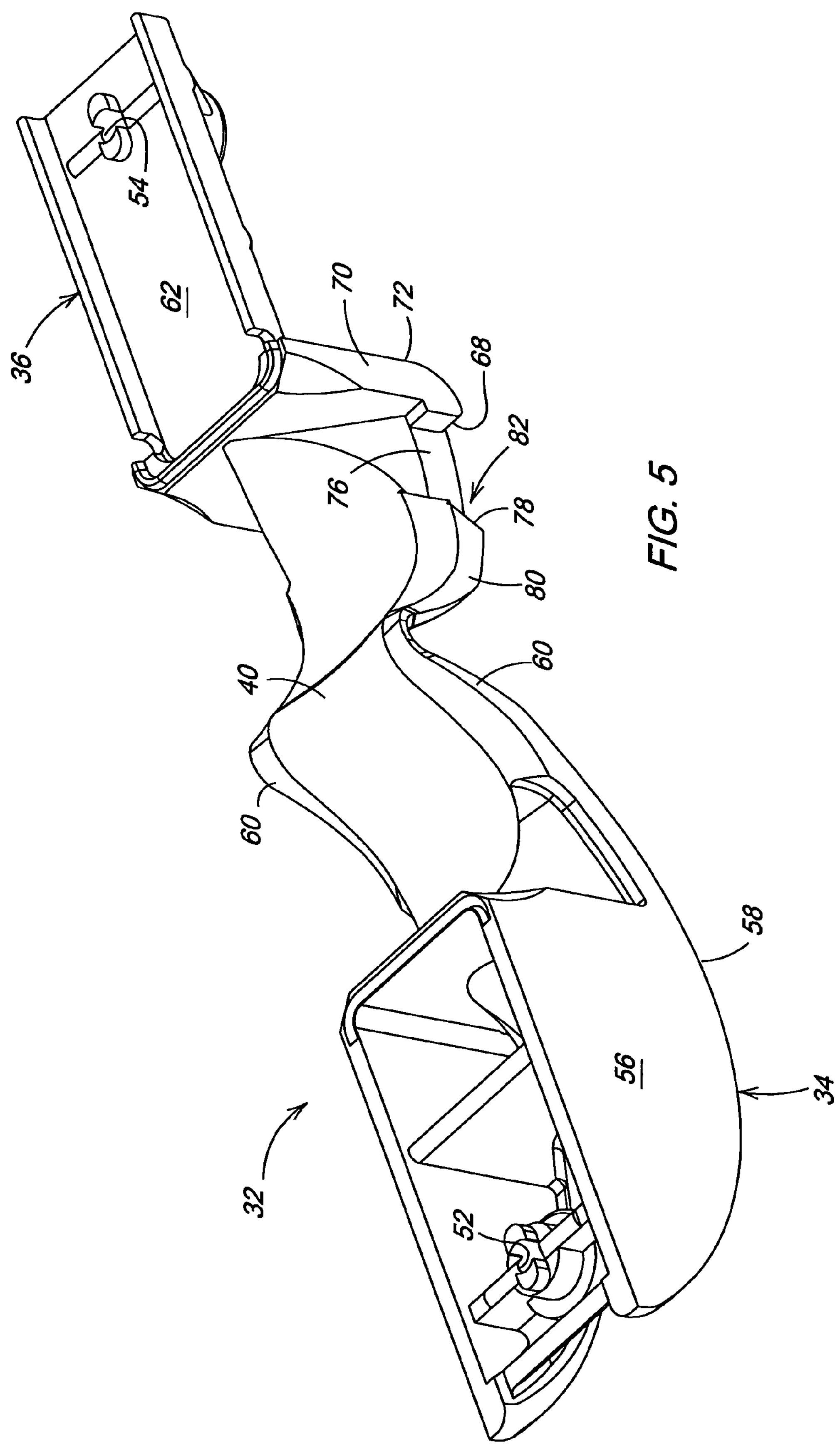
FIG. 5 is a perspective view of the stripper shown in FIG. 3 but showing the top half hinged away from the bottom half.
Figure 6:
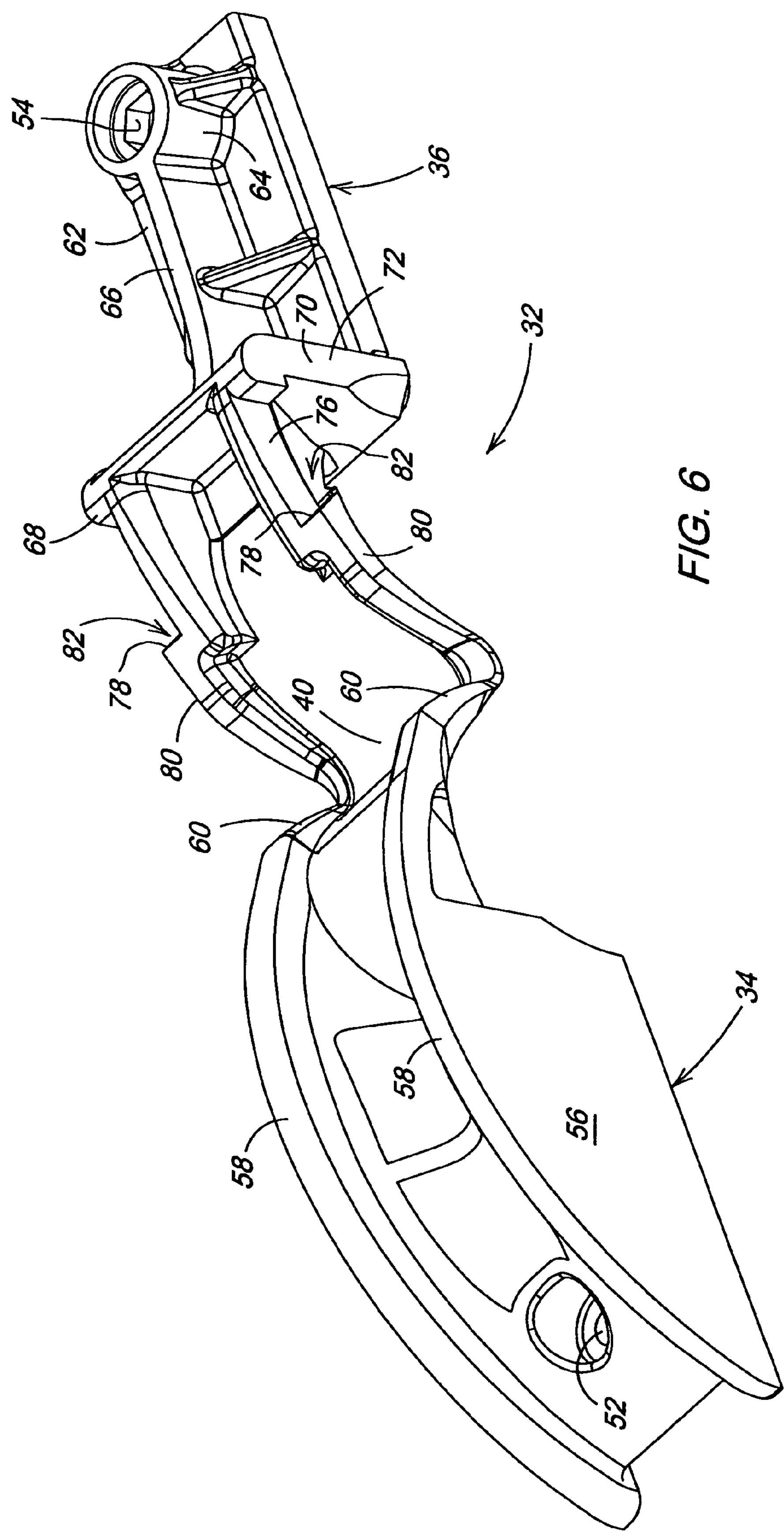
FIG. 6 is an inverted view of the stripper shown in FIG. 5.

Referring now to FIGS. 3–4, it can be seen that the upper section 34 of each stripper 32 is provided with a pair of transversely spaced planar sides 56 that extend perpendicular to the axis of the shaft 46 and terminate in, arcuate rear rim sections 58. Joined to forward ends of the rear sections 58 and extending about opposite ends of the shell 38 are forward rim sections 60. The strippers 32 are so oriented relative to the tine structures 24 that, as a given tine structure 24 sweeps past the rear rim sections 60 of adjacent strippers 32, an approximate right angle is continuously formed between the rim sections 60 and the curved leading edge 30 of each of the tines 26 and 28 of the given rotary conveyor tine structure 24. This orientation of the tine edges 30 to the stripper rim sections 60 results in the conveyed crop being lifted off the tines 26 and 28.

The lower stripper section 36 is constructed in quite a different fashion than is the upper stripper section 34 so as to prevent crop stems that are hair pinned about, and/or stuck to, the leading edge 30 of the tines 26 and 28 from being carried to a position where they become wrapped about the shaft 46. Specifically, the lower stripper section 36 does not have spaced side walls like the side walls 52 of the upper stripper section 30, but rather has a flat base 62 having the same width as, and having a planar surface engaging the underside of, the upper stripper section 34. Joined to a central rear part of the base 60 is a cylindrical boss 64 having the mounting hole 54 extending thorough it that is aligned with the mounting hole 52 in the upper stripper section 34 for receiving the bolt for mounting the stripper 32 to the mounting tab portion 50. A central, fore-and-aft extending rib 66, that is joined to the base 62, is joined to the boss 64 and to a transverse wall 68 at the front of the base 62. The transverse wall 68 has opposite planar side surfaces 70 and parallel front and rear surfaces that extend perpendicular to the base 62. The rear surface of the transverse wall 68 defines opposite stripper portions which face crop-receiving clearance areas at the opposite sides of the rib 66 and which cooperate with the side surfaces 70 to define respective, relatively sharp stripper edges 72 that extend perpendicular to the base 62. The front surface of the wall 68 is defined by a forwardly facing step surface 74. The stripper edges 72 serve to shear and/or strip crop carried by the tines 26 and 28 beyond the rim sections of the adjacent strippers 32 so as to keep the crop away from the tine mounting shaft 46. Beginning at an outer end portion of each step surface 74, relative to the base 62, and curved inwardly towards the shell 38, is a first outwardly facing surface section 76 having a forward end terminating at an inner edge or base of a rearwardly facing, axially extending intermediate surface 78 having an outer end joined to a second outwardly facing surface section 80 that is curved at a radius about the axis of the shell 38 and joins the front rim section 60. Thus, the first and intermediate surfaces 76 and 78, respectively, cooperate to define a notch 82, which operates to scrape off and dump any crop pieces, which find their way to the welded area of the tine structures 24 and are carried past the notches 82 by the rotating tine mounting shaft 46, so that the crop pieces are prevented from wrapping tightly about the tine mounting shaft 46. It is to be understood that the notches 82 could each just as well be defined by a first surface which is inclined inwardly to the intermediate surface 78 from the adjacent outer end surface 70 of the transverse wall 68.

During operation of the rotary conveyor 14, crop conditions may be such that pieces of crop material, especially if damp, thin stemmed and sticky, become bent around or hair pinned on the leading edges 30 of the tines 26 and 28. These crop pieces are carried past the rear rim sections 58 of the sides 56 of adjacent ones of the strippers 32. Once the tines 26 and 28 rotate below the upper stripper sections 34, and the bases 62 of the lower stripper sections 36, they enter the large clearance zone defined between the opposite sides of the base 62 and the rib 66 of each lower stripper section 36, into which the crop pieces, that are closest to the shaft 46, fall as they are engaged and pushed off the tines 26 and 28 by the stripper edges 72. If any of these crop pieces are carried beyond the stripper edges 72 and begin to rotate with the tine mounting shaft 46, they are scraped from the shaft 46 and dumped by the action of the notches 80 and front rim sections 60. Thus, it will be appreciated that the lower stripper sections 36 cooperate to keep crop pieces either from finding their way to the bases of the tines 26 and 28, where they could become wrapped about the tine mounting shaft 46, and/or by scraping them from the shaft 46 before they become tightly wound thereon.

Important to the function of the present invention is the flexible hinge section 42 which allows for ease of assembly by providing a wider clearance to assemble the one-piece stripper 32 around the rotor shaft 46.

Also important is the fact that the one-piece construction of the stripper 32 eliminates the need to provide matching pairs of sections, as was the case with the aforementioned patented design. Furthermore, because there is no need for interlocking teeth to form the hinge between the two sections, the manufacturing of the one-piece stripper is simplified with an attendant decrease in the cost of manufacture.

Having described the preferred embodiment, it will become apparent that various modifications can be made without departing from the scope of the invention as defined in the accompanying claims.

What is claimed is:

1. In a crop stripper adapted for being mounted between, and stripping crop material from, transversely spaced rigid flat tines of a rotary conveyor having a forward direction of rotation, including upper and lower sections coupled together and meeting at a plane, with the sections cooperating to define a cylindrical cavity so as to form a cylindrical opening adapted for receiving a cylindrical shaft of said rotary conveyor and, with said upper section being a semi-oval shape, when viewed from the side, and including a pair of parallel planar side walls spaced transversely from each other by a predetermined distance so as to just fit between adjacent flat tines of the rotary conveyor, said side walls extending perpendicular to said plane and including marginal portions defining arcuate rim sections, the improvement comprising: said upper and lower stripper sections forming a one-piece member including a flexible hinge section located at said cylindrical cavity so as to permit said sections to be separated one from the other at said plane a distance sufficient for the stripper to be mounted on and separated from said cylindrical shaft.

2. The stripper, as defined in claim 1, wherein said flexible hinge sections permits said upper section to be swung through an angle of 180° relative to said lower section.

3. The stripper, as defined in claim 1, wherein said cylindrical cavity is defined by a cylindrical shell; and a pair of front rim sections being respectively joined to said arcuate rim sections and located at opposite ends of said cylindrical shell and forming stripping elements for aiding in preventing a build up of crop material about the rotor shaft onto which the stripper is adapted for being mounted.

* * * * *